(12) United States Patent
Kitayama

(10) Patent No.: US 10,293,524 B2
(45) Date of Patent: May 21, 2019

(54) PRESS MOLDING APPARATUS AND PRESS MOLDING METHOD

(71) Applicant: HONDA MOTOR CO., LTD., Tokyo (JP)

(72) Inventor: Kenichi Kitayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 363 days.

(21) Appl. No.: 15/070,980

(22) Filed: Mar. 15, 2016

(65) Prior Publication Data
US 2016/0297114 A1  Oct. 13, 2016

(30) Foreign Application Priority Data

Apr. 8, 2015  (JP) ................. 2015-079083

(51) Int. Cl.
| | |
|---|---|
| *B29C 43/58* | (2006.01) |
| *B29C 43/02* | (2006.01) |
| B29C 43/36 | (2006.01) |
| B29K 701/12 | (2006.01) |
| B29K 105/06 | (2006.01) |
| B29K 309/08 | (2006.01) |
| B29K 309/02 | (2006.01) |
| B29L 31/30 | (2006.01) |
| B29K 105/00 | (2006.01) |

(52) U.S. Cl.
CPC .... *B29C 43/021* (2013.01); *B29C 2043/3665* (2013.01); *B29C 2043/5841* (2013.01); *B29C 2043/5883* (2013.01); *B29K 2105/06* (2013.01); *B29K 2105/256* (2013.01); *B29K 2309/02* (2013.01); *B29K 2309/08* (2013.01); *B29K 2701/12* (2013.01); *B29L 2031/30* (2013.01)

(58) Field of Classification Search
CPC ............ B29C 43/00; B29C 2043/3665; B29C 2043/5007
See application file for complete search history.

(56) References Cited

U.S. PATENT DOCUMENTS

| | | | | | |
|---|---|---|---|---|---|
| 4,044,188 | A | * | 8/1977 | Segal ................... | B29C 70/025 428/297.4 |
| 4,304,751 | A | * | 12/1981 | Li ........................ | B29C 35/16 264/322 |
| 5,015,426 | A | * | 5/1991 | Maus ................... | B29C 45/561 264/2.2 |

FOREIGN PATENT DOCUMENTS

| | | |
|---|---|---|
| JP | 02-062214 A | 3/1990 |
| JP | 03-001914 A | 1/1991 |
| JP | H09-267344 A | 10/1997 |

OTHER PUBLICATIONS

Office Action for JP Patent Application No. 2015-079083, dated Oct. 23, 2018, 03 pages of Office Action and 03 pages of English Translation.

* cited by examiner

*Primary Examiner* — Monica A Huson
*Assistant Examiner* — Kelsey C Grace
(74) *Attorney, Agent, or Firm* — Chip Law Group

(57) ABSTRACT

A press molding apparatus includes two dies and press-molds a heated stampable sheet into a predetermined shape by using the two dies. The press molding apparatus includes a movable core provided in at least one of the two dies. The movable core is disposed at an inward side of an edge portion of a cavity. When receiving a pressure greater than or equal to a predetermined value, the movable core moves in such a direction that the cavity increases in volume.

9 Claims, 7 Drawing Sheets

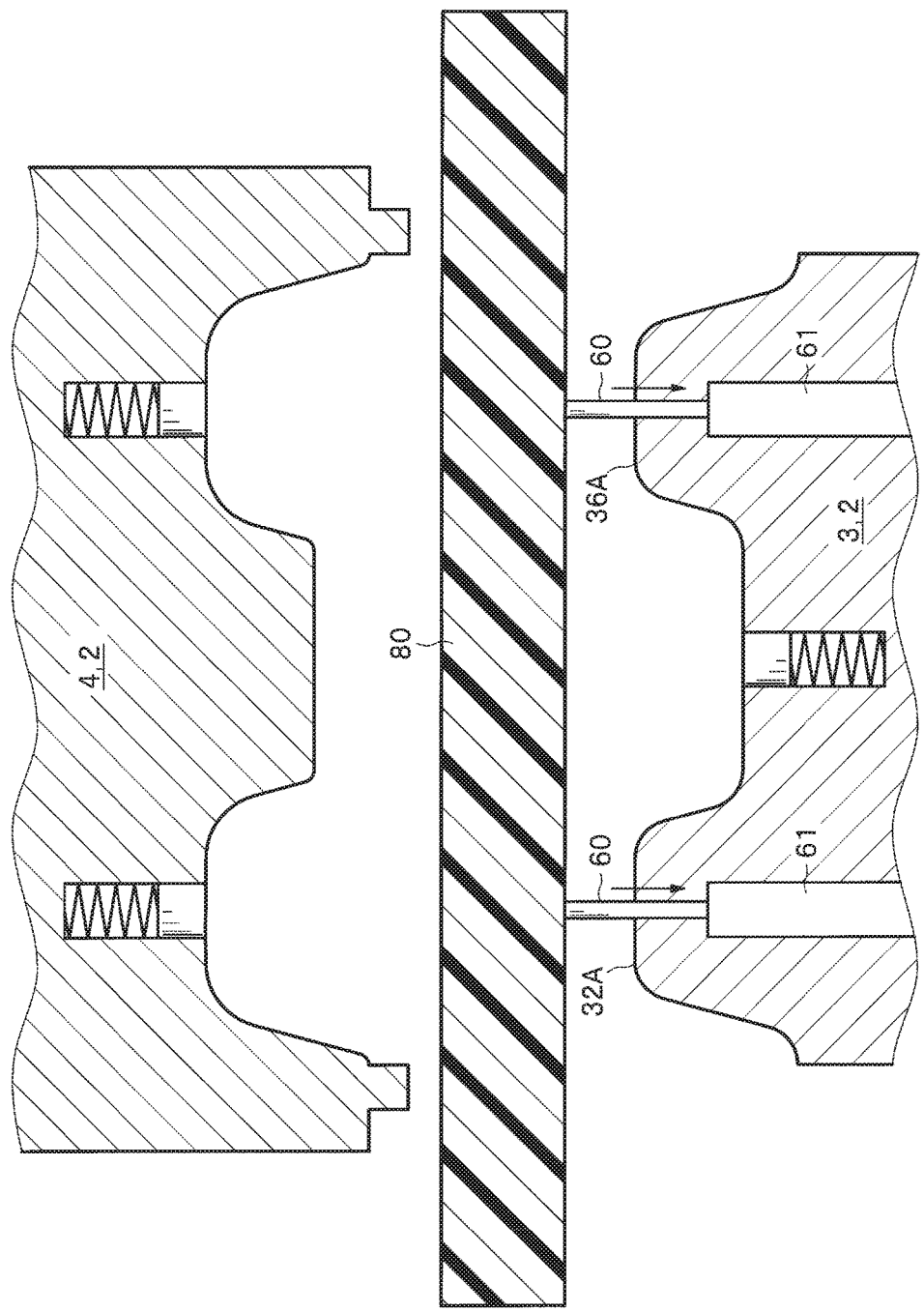

PRESS MOLDING APPARATUS AND PRESS MOLDING METHOD

CROSS REFERENCES TO RELATED APPLICATIONS

The present application claims priority under 35 U.S.C. § 119 to Japanese Patent Application No. 2015-079083, filed Apr. 8, 2015, entitled "Press Molding Apparatus and Press Molding Method." The contents of this application are incorporated herein by reference in their entirety.

BACKGROUND

1. Field

The present disclosure relates to a press molding apparatus and a press molding method.

2. Description of the Related Art

In recent years, in order to reduce the weight of vehicles, a stampable sheet (fiber reinforced composite) obtained by combining thermoplastic resin and reinforcing fiber, such as glass fiber or carbon fiber, has been used as a material of component parts. The stampable sheet is a base material obtained by impregnating reinforcing fiber with thermoplastic resin and then forming the composite into a planar shape.

An example of a processing method for a stampable sheet is a press molding process in which a heated and softened stampable sheet is pressed by a pair of dies. In this molding method, a stampable sheet disposed in a cavity defined by a lower die and an upper die is pressed so that the stampable sheet flows in and fills the cavity, for example, a pressed portion escapes or a pressed portion pulls another portion, so as to provide a molded product that has sheet thickness and shape as desired.

Note that when the stampable sheet is heated, the resin restraining the reinforcing fiber melts and the reinforcing fiber is released from the restraint, causing a spring back. Therefore, the sprung-backed material needs to be pressed to an original thickness in order to recover the physical property (mechanical characteristic) of the material.

However, even though the material is pressed to the original sheet thickness and assumes the thickness determined by the dies, the flowage of the stampable sheet in the cavity during the press molding process results in an insufficient weight per unit area (basis weight) and spring back of the material remains (i.e., void remains in the material and the density thereof remains low), giving rise to a risk of reducing the connection between the reinforced resin and the fiber or the like and therefore causing deterioration of the physical property (mechanical characteristics) of the molded product.

Furthermore, a variation in basis weight of the stampable sheet prior to the molding process, which is another cause for an insufficient basis weight of the molded product, also gives rise to a problem of the molded product similar to the aforementioned problem.

In view of such circumstances, Japanese Unexamined Patent Application Publication No. 9-267344 proposes that a stampable sheet that, before being heated, has a greater thickness than the molded product has be used so that the volume of the thermoplastic resin will not become insufficient at various sites in the cavity.

Furthermore, in Japanese Unexamined Patent Application Publication No. 9-267344, in order to cause surplus thermoplastic resin to flow out of the die through an edge portion side of the cavity, an end edge of an opening portion of the die is provided with a cutout (overflow gate).

However, in some cases, a die has, at a site at an inward side of the edge portion of the cavity, protuberances and depressions for giving a shape to the molded product. When a stampable sheet is pressed by such dies, there is possibility that the material may flow as if it is drawn in by protuberances and depressions and part of the material may reside in large amounts at the inward side of the opening portions of the dies.

In other words, due to the presence of protuberances and depressions or due to large flow resistance of the material depending on the area, there is a risk of surplus thermoplastic resin (waste resin) failing to reach an opening portion of a die which is an ejection portion provided at a terminal end. Then, the surplus thermoplastic resin does not flow out of the dies through the overflow gate but excess amounts of thermoplastic resin (hereinafter, referred to as "excess portions") reside at sites near protuberances and depressions.

As a result, a hard stop happens in which the internal die pressure (reaction force) from the excess portions exceeds the pressing force of the press machine before closure of the pair dies and therefore the dies cannot be tightly closed.

Possibility of appearance of an excess portion exists not only in the foregoing case but also in the case where the stampable sheet has a basis weight variation and the like.

SUMMARY

The present application describes a press molding apparatus and a press molding method capable of preventing a hard stop.

According to an aspect of the present disclosure, a press molding apparatus includes two dies and press-molds a heated stampable sheet into a predetermined shape by using the two dies. The press molding apparatus includes a movable core provided in at least one of the two dies, and the movable core is disposed at an inward side of an edge portion of a cavity and, when receiving a pressure greater than or equal to a predetermined value, moves in such a direction that the cavity increases in volume.

According to another aspect of the present disclosure, a press molding method in which a heated stampable sheet is disposed between two dies and the stampable sheet is press-molded into a predetermined shape by using the two dies includes providing at least one of the two dies with a movable core and disposing the movable core at an inward side of an edge portion of a cavity so that when receiving a pressure greater than or equal to a predetermined value, the movable core moves in such a direction that the cavity increases in volume.

According to the press molding apparatus and the press molding method of the present disclosure, when the internal die pressure of the excess portion reaches the predetermined pressure due to the pressing, the movable core moves so that the cavity increases in volume. Then, part of the excess portion flows into the enlarged cavity, so that the internal die pressure of the excess portion is substantially prevented from increasing. Therefore, the internal die pressure of the excess portion is kept at the predetermined pressure, and occurrence of the hard stop is substantially prevented.

In the press molding apparatus and the press molding method described above, the predetermined value may be set to a pressure needed in order to cause the stampable sheet to recover a mechanical characteristic that the stampable sheet has before being heated.

Therefore, after the movable core receives pressure that is greater than or equal to the pressure needed in order to cause the excess portion to recover the mechanical characteristics of the not-yet-heated stampable sheet, the movable core moves. Hence, the excess portion will have the mechanical characteristics of the not-yet-heated stampable sheet.

In the press molding apparatus and the press molding method, the two dies may include a lower die and an upper die that faces the lower die, a cavity surface of the lower die may be constituted by a plurality of surfaces that include a first surface and a second surface positioned below the first surface, and the movable core may be provided in at least one of the second surface and a facing surface of the upper die which faces the second surface.

Since the facing surface of the upper die which faces the second surface pressurizes the thermoplastic resin toward the second surface, the thermoplastic resin in contact with the first surface can sometimes be drawn toward the second surface. Hence, there is a risk of an excess portion appearing between the second surface and the facing surface.

In such a case, when the internal die pressure of the excess portion pressed between the second surface and the facing surface reaches the predetermined value, the movable core provided in at least one of the second surface and the facing surface moves. Hence, the internal die pressure is restrained from rising, so that occurrence of the hard stop can be prevented.

In the press molding apparatus and the press molding method, a thickness of the stampable sheet may be greater than a thickness of a molded product and the two dies may include a lower die and an upper die that faces the lower die. Furthermore, a cavity surface of the lower die may be constituted by a plurality of surfaces that include a first surface and a second surface positioned below the first surface, the first surface may be a placing surface on which the stampable sheet is placed, and the movable core may be provided in at least one of the placing surface and a facing surface of the upper die which faces the placing surface.

The aforementioned outflow of the thermoplastic resin is likely to occur particularly between the placing surface and the facing surface. However, according to the foregoing constitution of the press molding apparatus and method, since the stampable sheet having a great thickness is used, a volume of stampable sheet material (thermoplastic resin that contains reinforcing fiber) needed in order to obtain desired mechanical characteristics remains between the placing surface and the facing surface. Hence, the portion press-molded between the placing surface and the facing surface obtains desired mechanical characteristics.

On the other hand, in the case where the volume of outflow of the thermoplastic resin from between the placing surface and the facing surface is small, an excess portion appears between the placing surface and the facing surface.

In that case, when the internal die pressure of the excess portion pressed between the placing surface and the facing surface reaches the predetermined value, the movable core provided in at least one of the placing surface and the facing surface moves. Hence, the internal die pressure is restrained from rising and occurrence of the hard stop can be avoided.

Still further, in the press molding apparatus and the press molding method, the stampable sheet may include a first stampable sheet and a second stampable sheet superposed on the first stampable sheet, at least one of end portions of the second stampable sheet may be disposed in the cavity, and the movable core may be provided in an end portion-pressurizing surface that pressurizes, when the stampable sheet is pressed, an end portion of the second stampable sheet or near the end portion-pressurizing surface.

Due to position shift of the second stampable sheet, the end portion of the second stampable sheet can sometimes be disposed beyond the predetermined position. Hence, the end portion of the second stampable sheet becomes an excess portion.

In that case, when the internal die pressure of the excess portion reaches the predetermined value, the movable core disposed in the end portion-pressurizing surface that pressurizes the excess portion (end portion of the second stampable sheet) or near the end portion-pressurizing surface moves. Hence, the internal die pressure is restrained from rising and occurrence of the hard stop can be prevented.

According to the present disclosure, a press molding apparatus and a press molding method capable of preventing occurrence of the hard stop can be provided.

BRIEF DESCRIPTION OF THE DRAWINGS

FIG. 4 is a sectional view of a modification of the press molding apparatus of the first embodiment.

DESCRIPTION OF THE PREFERRED EMBODIMENTS

Figure 1:
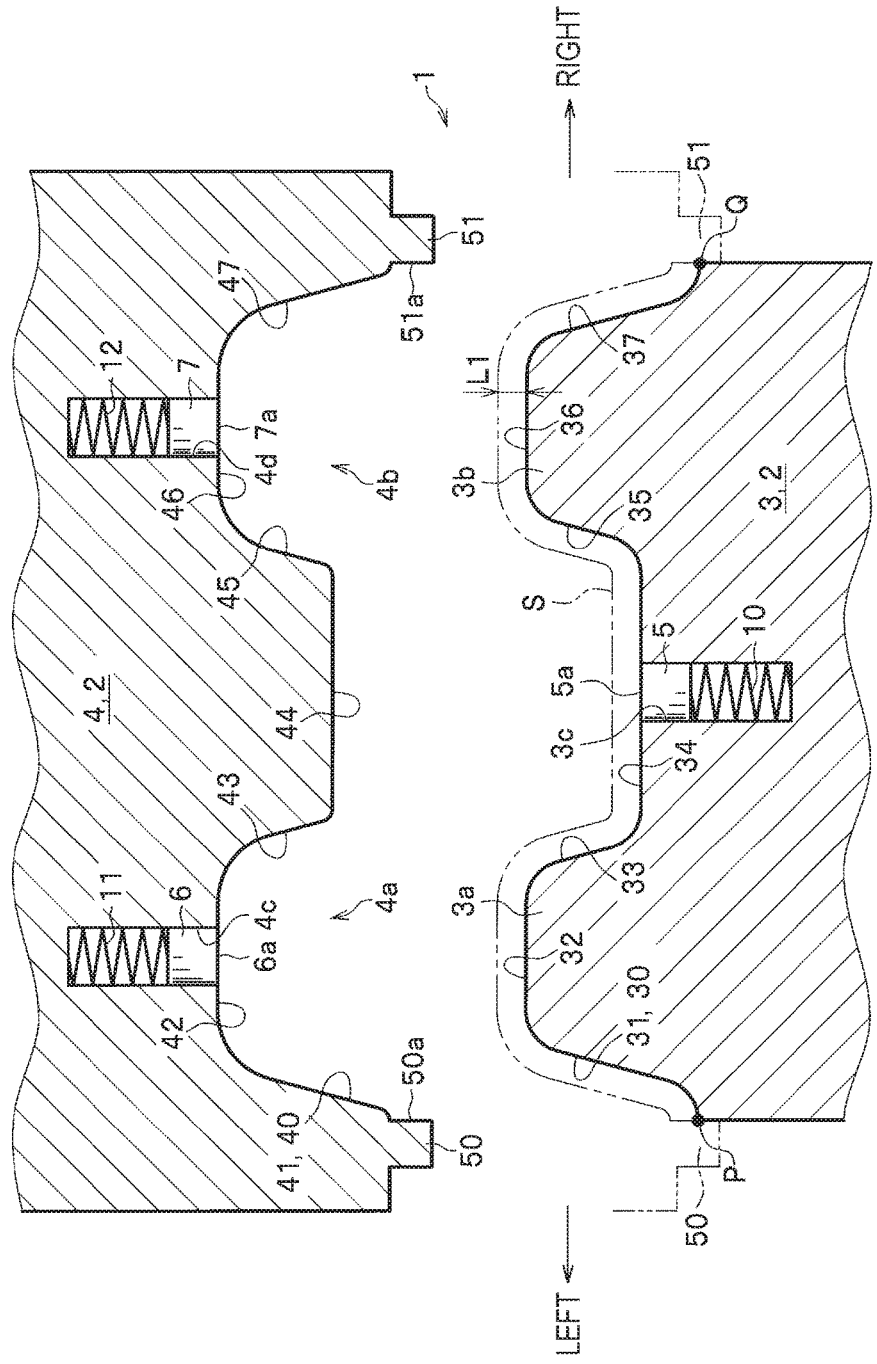
FIG. 1 is a sectional view of a press molding apparatus in a first embodiment of the present disclosure.

First and second embodiments of the present disclosure will be described with reference to the accompanying drawings. First, stampable sheets 80 and 180 that are objects to process will be described.

Stampable Sheet

The stampable sheets 80 and 180 (see FIGS. 2A to 2C, FIGS. 7A to 7C, etc.) are molded articles that have been molded into a planar shape by heating a thermoplastic resin that contains therein glass fiber or carbon fiber (not shown in the drawings) and stamping (compressing) the resin under a predetermined pressure.

Since the stampable sheets 80 and 180 are formed from thermoplastic resin, the stampable sheets 80 and 180 are solid at normal temperature. When heated to a predetermined temperature, the stampable sheets soften and then expand in a thickness direction as compression pressure is lost.

First Embodiment

A press molding apparatus 1 according to a first embodiment, as shown in FIG. 1, includes a pair of dies 2 and 2 and a press machine (not shown in the drawings). The press molding apparatus 1 is an apparatus for producing a molded product by press molding a heated stampable sheet 80 into a predetermined shape by using the pair of dies 2.

The pair of dies 2 includes a lower die 3 fixed to a fixed base (not shown) and an upper die 4 that is supported by the press machine and that faces the lower die 3.

An upper surface 30 of the lower die 3 is a cavity surface that molds a lower surface of the stampable sheet 80. The lower die 3 is provided with protuberances and depressions. The upper surface 30 of the lower die 3 is made up of a plurality of surfaces that include placing surfaces (a first placing surface 32 and a second placing surface 36) on which the stampable sheet 80 is placed and a bottom surface 34 positioned below the placing surfaces.

The placing surfaces (the first placing surface 32 and the second placing surface 36) in the first embodiment correspond to the "placing surface" described in the appended claims. The bottom surface 34 in this embodiment corresponds to the "second surface" described in the appended claims.

The "placing surface" in the present disclosure is not limited to a surface that the stampable sheet 80 first contacts when lowered from above the upper surface 30 of the lower die 3, that is, an uppermost surface of the lower die 3 which is positioned uppermost in the upper surface 30. For example, the "placing surface" also includes a surface that the stampable sheet 80 placed on the uppermost surface contacts as the stampable sheet 80 deforms downward as if it slackens downward due to its own weight (a surface that the stampable sheet 80 contacts before being pressed by the upper die 4).

Concretely, the lower die 3 has a first protrusion portion 3a and a second protrusion portion 3b. The first protrusion portion 3a and the second protrusion portion 3b are apart from each other in the left-right direction and protrude upward from an upper portion of the lower die 3. The upper surface 30 of the lower die 3 is made up of an inclined first slant surface 31, a flat first placing surface 32, an inclined second slant surface 33, a flat bottom surface 34, an inclined third slant surface 35, a flat second placing surface 36, and an inclined fourth slant surface 37 that are arranged in order from a left side to a right side.

A lower surface 40 of the upper die 4 is a cavity surface that molds an upper surface of the stampable sheet 80. The upper die 4 is provided with a first depression portion 4a and a second depression portion 4b that correspond to the first protrusion portion 3a and the second protrusion portion 3b, respectively, of the lower die 3. Thus, the lower surface 40 of the upper die 4 is constituted by a plurality of surfaces that include placing surface-facing surfaces (the first facing surface 42 and a second facing surface 46) that face the placing surfaces (the first placing surface 32 and the second placing surface 36) of the lower die 3 and a bottom surface-facing surface 44 that faces the bottom surface 34 of the lower die 3.

Concretely, the first depression portion 4a and the second depression portion 4b are apart from each other in the left-right direction and are depressed upward from a lower portion of the upper die 4. Therefore, the lower surface 40 of the upper die 4 is made up of an inclined fifth slant surface 41, the flat first facing surface 42, an inclined sixth slant surface 43, the flat bottom surface-facing surface 44, an inclined seventh slant surface 45, the flat second facing surface 46, and an inclined eighth slant surface 47 that are arranged in order from the left side to the right side.

When the lower die 3 and the upper die 4 are clamped together, a cavity S (indicated by an interrupted line in FIG. 1) formed between the upper surface 30 and the lower surface 40 of the dies 3 and 4 has a uniform length L1 in an up-down direction, so that the molded product will have a uniform thickness.

The upper die 4 has, on the left side in the lower surface 40, a first punch 50 that protrudes downward.

At the time of mold clamping, the first punch 50 protrudes downward beyond the first slant surface 31 of the lower die 3 and cuts a left-side end of the molded product and a superfluous stampable sheet 80 apart from each other.

Furthermore, at the times of mold clamping, a right surface 50a of the first punch 50 connects continuously to the first slant surface 31 of the lower die 3. Therefore, a left side of the cavity S is closed.

On a left side in the lower surface 40 of the upper die 4, a second punch 51 that protrudes downward is provided.

At the time of mold clamping, the second punch 51 protrudes downward beyond the fourth slant surface 37 of the lower die 3 and cuts a right-side end of the molded product and a superfluous stampable sheet 80 apart from each other.

Furthermore, at the time of mold clamping, a left surface 51a of the second punch 51 connects continuously to the fourth slant surface 37 of the lower die 3. Therefore, a right side of the cavity S is closed.

Note that the "edge portion of the cavity" mentioned in the appended claims refers to portions P and Q where the upper surface 30 of the lower die 3 and the lower surface 40 of the upper die 4 connect continuously to each other when the lower and upper dies 3 and 4 are clamped together.

The lower die 3 is provided with a first movable core 5. The upper die 4 is provided with a second movable core 6 and a third movable core 7.

Note that the first movable core 5, the second movable core 6, and the third movable core 7 have the same configuration. Therefore, in the following description, the first movable core 5 will be described as a representative of the these cores and the second movable core 6 and the third movable core 7 will be described only in terms of differences from the first movable core 5.

The first movable core 5 has a cylindrical shape whose center axis extends in the up-down direction, and is housed in a cylindrical hole 3c formed in the lower die 3. An upper surface 5a of the first movable core 5 forms a part of the bottom surface 34 of the lower die 3. That is, the first movable core 5 is disposed at the inward side of the edge portions P and Q of the cavity S.

A lower surface 6a of the second movable core 6 forms a part of the first facing surface 42 of the upper die 4. A lower surface 7a of the third movable core 7 forms a part of the second facing surface 46 of the upper die 4. Therefore, the second movable core 6 and the third movable core 7 are disposed also at the inward side of the edge portions P and Q of the cavity S.

The first movable core 5 is movably supported by a first coil spring 10 that is compressible by pressure that is greater than or equal to a predetermined value. Therefore, when pressure greater than or equal to the predetermined value acts on the upper surface 5a of the first movable core 5, the first coil spring 10 is compressed and the first movable core 5 moves downward. In other words, when pressure greater than or equal to the predetermined value acts on the first movable core 5, the first movable core 5 is moved in such a direction that the volume of the cavity S increases.

Furthermore, the aforementioned predetermined value is set to a pressure needed in order to recover the mechanical characteristics that the stampable sheet 80 has before being heated (hereinafter, referred to as "physical property-recovering pressure").

As for the press machine, the pressing force for moving the upper die 4 is set higher than the physical property-recovering pressure. The press machine is configured to stop pressing when the internal die pressure (reaction force) received from the molding object becomes higher than the pressing force.

Press Molding Method

Next, with reference to FIGS. 2A to 2C and FIGS. 3A to 3C, a method for press-molding the stampable sheet 80 by using the press molding apparatus 1 will be described.

The press molding method includes the disposal step of disposing a heated stampable sheet 80 between the two dies 2 and 2 (the lower die 3 and the upper die 4) and the press step of press-molding the stampable sheet 80 into a predetermined shape by using the two dies 2 and 2 (the lower die 3 and the upper die 4).

Figure 2A:
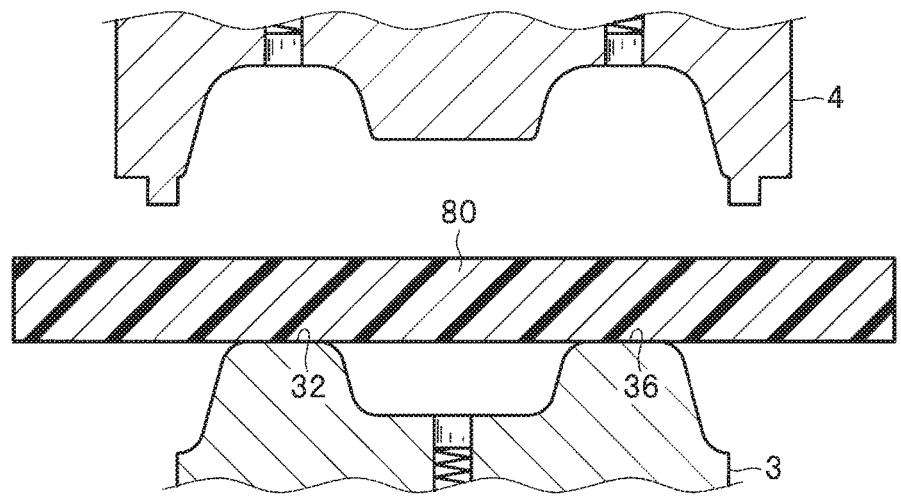
FIGS. 2A to 2C are sectional views showing processes of a press molding method according to the first embodiment, FIG. 2A showing a state in which a stampable sheet is disposed, FIG. 2B showing a state in which an upper die is in contact with the stampable sheet, and FIG. 2C showing a state in which thermoplastic resin has moved due to pressing.

In the disposal step, the stampable sheet 80 is placed on the first placing surface 32 and the second placing surface 36 of the lower die 3 (see FIG. 2A).

Furthermore, the stampable sheet 80 for use in this embodiment has a thickness greater than the thickness L1 of the molded product to be produced.

Furthermore, the stampable sheet 80 has been heated to a predetermined temperature. Therefore, the stampable sheet 80 has softened and expanded in the thickness direction.

In the press step, the press machine is driven to move the upper die 4 downward so as to perform the clamping of the lower die 3 and the upper die 4.

Concretely, as the upper die 4 moves downward, the bottom surface-facing surface 44, the first punch 50, and the second punch 51 of the upper die 4 first contact the upper surface of the thermoplastic resin (the stampable sheet 80).

Figure 2B:
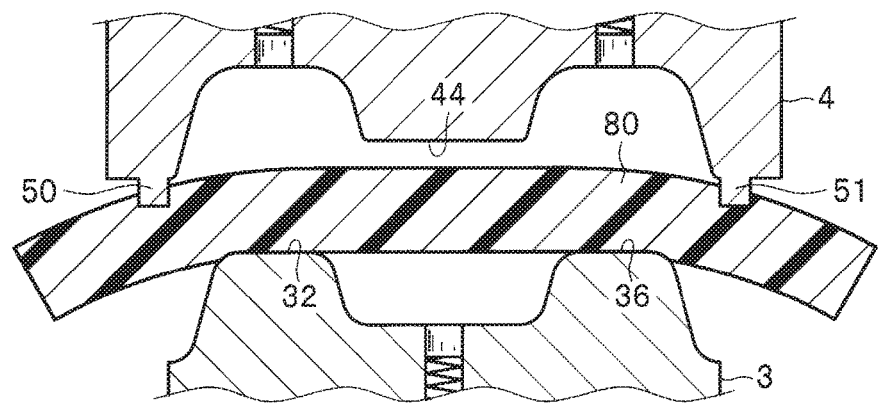
Figure 2C:
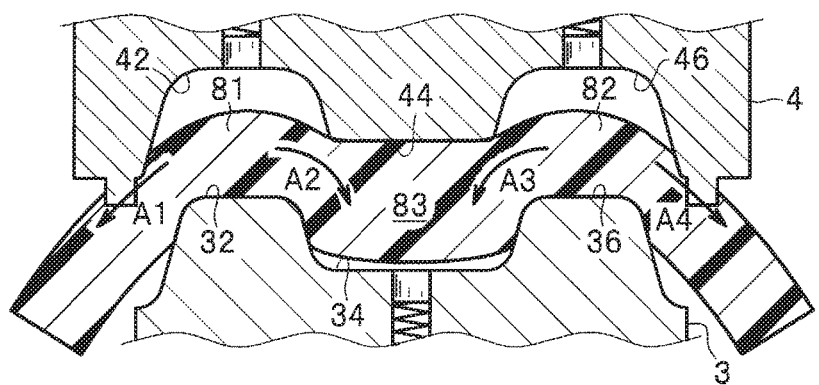

As the upper die 4 moves further downward, the bottom surface-facing surface 44, the first punch 50, and the second punch 51 separately pressurize downward the portions with which the bottom surface-facing surface 44, the first punch 50, and the second punch 51 are in contact (see FIGS. 2B and 2C).

Therefore, as for the thermoplastic resin, the portions pressurized by the bottom surface-facing surface 44, the first punch 50, and the second punch 51 move downward.

On the other hand, portions of the thermoplastic resin that are not pressurized by the lower die 3 are pulled by the portions that move downward, and therefore reduce in volume.

That is, in the thermoplastic resin, part of a portion disposed between the first placing surface 32 and the first facing surface 42 flows out toward the left and right side (see arrows A1 and A2 in FIG. 2C). Hereinafter, a remaining portion of the thermoplastic which that remains between the first placing surface 32 and the first facing surface 42 will be referred to as first reduced portion 81.

Likewise, in the thermoplastic resin, part of a portion disposed between the second placing surface 36 and the second facing surface 46 flows out toward the left and right sides (see arrows A3 and A4 in FIG. 2C). Hereinafter, a remaining portion of the thermoplastic resin which remains between the second placing surface 36 and the second facing surface 46 will be referred to as second reduced portion 82.

As a result, between the bottom surface 34 and the bottom surface-facing surface 44, the thermoplastic resin flows in, so that a large amount of the thermoplastic resin resides. Hereinafter, the thermoplastic resin disposed between the bottom surface 34 and the bottom surface-facing surface 44 will be referred to as excess portion 83.

Note that although this embodiment has been described with an example in which the pressurization by the dies 2 causes the thermoplastic resin of the stampable sheet 80 to move so as to produce the excess portion 83, appearance of such an excess portion is not limited to this example.

Figure 9:
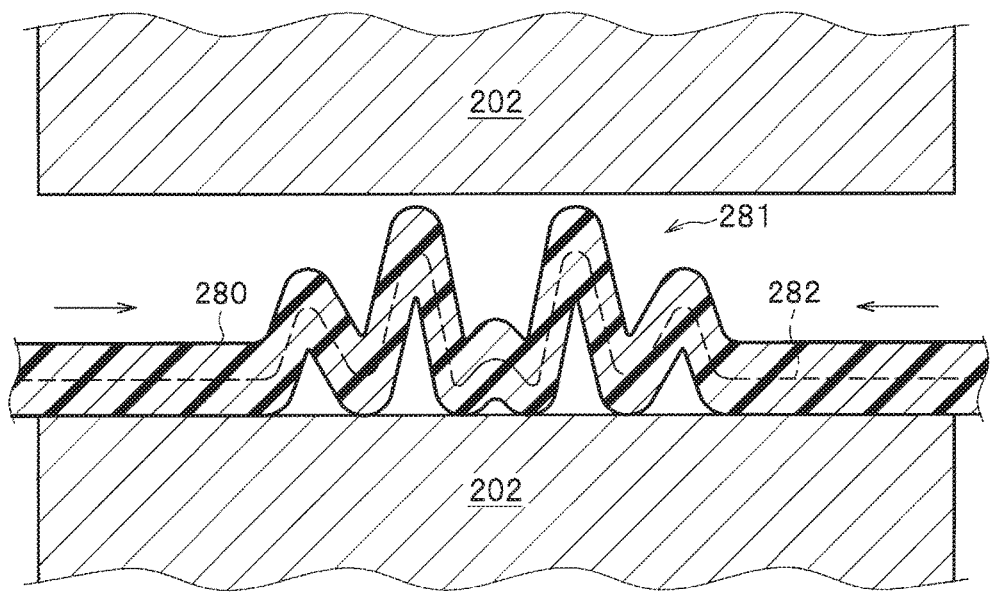
FIG. 9 is a sectional view of a stampable sheet in which a creased portion (excess portion) has appeared.

An excess portion can also be formed, for example, as shown in FIG. 9. In this example, due to the pressurization by dies 202, a stampable sheet 280 is drawn in (see arrows in FIG. 9) so that a creased portion 281 is formed, that is, reinforcing fiber 282 moves together with the thermoplastic resin so that a portion of the stampable sheet 280 is wavy.

Figure 3A:
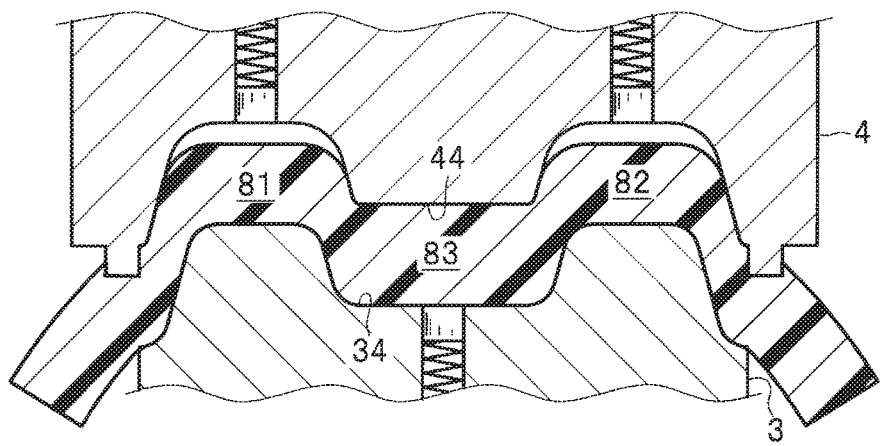
FIGS. 3A to 3C are sectional views showing processes of the press molding method according to the first embodiment, FIG. 3A showing a state in which excess portions have begun being compressed, FIG. 3B showing a state in which a first reduced portion and a second reduced portion have begun being compressed, and FIG. 3C showing a state in which the dies have been clamped.
Figure 3B:
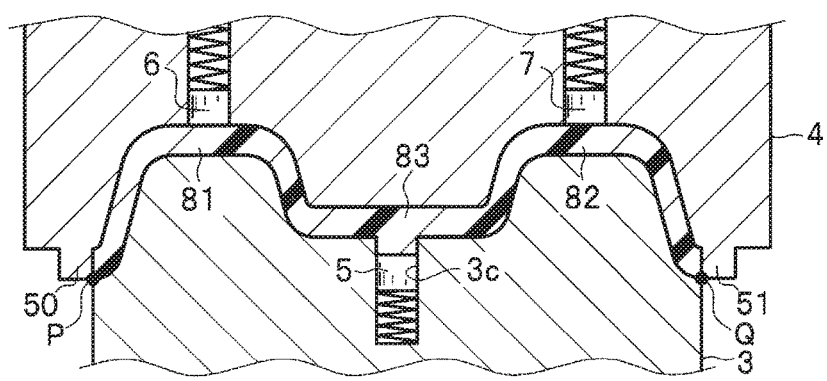

After the state shown in FIG. 2C, the upper die 4 moves further downward, so that the excess portion 83 larger in volume than the first reduced portion 81 and than the second reduced portion 82 begins to be pressed (compressed) (see FIG. 3A). As a result, the excess portion 83 is degassed, so that the density of the excess portion 83 increases and the thickness thereof gradually decreases.

Incidentally, since the first reduced portion 81 and the second reduced portion 82 are small in volume, neither the first reduced portion 81 nor the second reduced portion 82 is pressed at the time point when the excess portion 83 starts to be pressed (see FIG. 3A).

When the internal die pressure caused on the lower die 3 and the upper die 4 by the excess portion 83 reaches the physical property-recovering pressure as the upper die 4 moves further downward, the excess portion 83 has the mechanical characteristics of the not-yet-heated stampable sheet 80.

Then, as the upper die 4 moves further downward after the excess portion 83 has obtained the mechanical characteristics of the not-yet-heated stampable sheet 80, the internal die pressure of the excess portion 83 exceeds the predetermined value and the first movable core 5 moves. Then, part of the excess portion 83 flows into the cylindrical hole 3c (see FIG. 3B). Thus, the internal die pressure of the excess portion 83 is kept at the physical property-recovering pressure.

As a result, the press machine does not undergo a hard stop due to the internal die pressure of the excess portion 83 but continues moving the upper die 4 downward to perform pressing (compression) between the first reduced portion 81 and the second reduced portion 82.

Note that at the time point when the pressing (compression) between the first reduced portion 81 and the second reduced portion 82 is performed, the first punch 50 and the second punch 51 cut the thermoplastic resin (the stampable sheet 80) and close the cavity S. As a result, the thermoplastic resin does not flow out of the dies through the edge portions P and Q of the cavity S.

Although the first reduced portion 81 and the second reduced portion 82 each have reduced in volume (see the arrows A1 to A4 in FIG. 2C), the stampable sheet 80 used in this press machine has a thickness greater than the thickness L1 of the molded product. Therefore, at least the volume of the thermoplastic resin needed in order to obtain the mechanical characteristics of the not-yet-heated stampable sheet 80 at the time of mold clamping is secured.

Therefore, as the upper die 4 moves downward, the first reduced portion 81 and the second reduced portion 82 each have the mechanical characteristics of the not-yet-heated stampable sheet 80.

Then, as the upper die 4 moves further downward after the first reduced portion 81 and the second reduced portion 82 each obtain the mechanical characteristics of the not-yet-heated stampable sheet 80, the internal die pressure of each of the first reduced portion 81 and the second reduced portion 82 exceeds the predetermined value and the second movable core 6 and the third movable core 7 move.

Then, part of the first reduced portion 81 flows into the cylindrical hole 4c. Thus, the internal die pressure of the first reduced portion 81 is kept at the physical property-recovering pressure.

Likewise, part of the second reduced portion 82 flows into the cylindrical hole 4d. Thus, the internal die pressure of the second reduced portion 82 is kept at the physical property-recovering pressure.

Figure 3C:
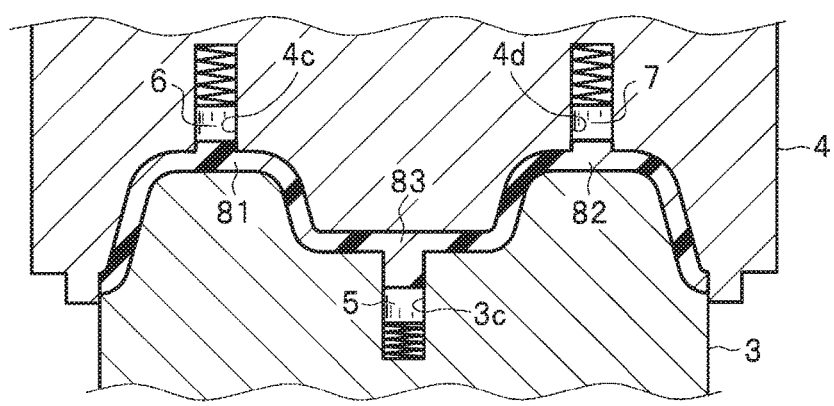

As a result, the press machine does not undergo the hard stop due to the internal die pressure of the first reduced portion 81 and the second reduced portion 82 but continues moving the upper die 4 downward so as to certainly carry out the mold clamping (see FIG. 3C).

After the mold opening, mold release is carried out and projections of the molded product (sites formed by the material flowing into the cylindrical holes 3c, 4c, 4d) are cut to produce a molded product. Incidentally, if the molded product is used as a member that is not externally visible, the process of cutting projections is unnecessary.

Thus, according to the press molding apparatus 1 and the press molding method of the first embodiment, occurrence of the hard stop can be prevented. Furthermore, a molded product having the mechanical characteristics of the not-yet-heated stampable sheet 80 can be produced.

Although the press molding apparatus 1 and the press molding method of the first embodiment have been described above, the present disclosure is not limited by the examples described in conjunction with the embodiment.

For example, although in the foregoing embodiment, of the bottom surface (second surface) 34 and the bottom surface-facing surface 44 that press the excess portion 83, the bottom surface (second surface) 34 is provided with the first movable core 5, the bottom surface-facing surface 44 may instead be provided with a first movable core 5. That is, as long as at least one of the bottom surface (second surface) 34 and the bottom surface-facing surface 44 is provided with a first movable core 5, the internal die pressure of the excess portion 83 can be restrained from rising.

Furthermore, although, of the first placing surface (placing surface) 32 and the first facing surface 42 that press the first reduced portion 81, the first facing surface 42 is provided with the second movable core 6, the first placing surface (placing surface) 32 may instead be provided with a second movable core 6. That is, as long as at last one of the first placing surface (placing surface) 32 and the first facing surface 42 is provided with a second movable core 6, the internal die pressure of the first reduced portion 81 can be restrained form rising.

Still further, although in the embodiment, both the lower die 3 and the upper die 4 are provided with movable cores (the first to third movable cores 5 to 7), a movable core in the present disclosure is not limited by the example of the embodiment as long as a movable core is provided in at least one of the two dies 2 and 2.

Furthermore, although in the embodiment, the predetermined value of pressure at which the movable cores (the first to third movable cores 5 to 7) move is set as a physical property-recovering pressure, this does not limit the present disclosure.

In the present disclosure, it suffices that the predetermined pressure of pressure at which a movable core moves is set less than the limit pressure for the hard stop. Therefore, the predetermined pressure at which the movable cores move may be set less than the physical property-recovering pressure. However, in the case of this setting, the molded product does not have the mechanical characteristics of the not-yet-heated stampable sheet 80.

Incidentally, in the present disclosure, the predetermined pressure at which the movable cores move is preferred to be set at a value that is less than the limit pressure for the hard stop and that is near the limit pressure. According to this setting, the movable cores are less easily movable and therefore resin in the excess portion 83 is more likely to return into the first reduced portion 81 and the second reduced portion 82. As a result, the thermoplastic resin is less likely to enter the cylindrical hole 3c and the like, that is, projections molded by the cylindrical hole 3c and the like are less likely to be produced, so that the operation of cutting such projections and the like subsequently to the mold release can be avoided.

Furthermore, although the embodiment uses the coil springs (the first to third coil springs 10 to 12) as component parts for movably supporting the movable cores (the first to third movable cores 5 to 7), cylinders (gas cylinders or hydraulic cylinders) may instead be used.

Incidentally, as for the coil springs and the cylinders, it is more preferable to use the coil springs.

Furthermore, although in the embodiment, the placing surfaces formed as flat surfaces whose areas of contact with the stampable sheet 80 are relatively large (the first and second placing surfaces 32 and 36) are structures that correspond to the placing surface in the present disclosure, this does not limit the present disclosure. For example, structures whose areas of contact with the stampable sheet 80 are very small, for example, top surfaces of projectile members or portions such as beads or bosses, are also included in the placing surface in the present disclosure.

Furthermore, although in the embodiment, the placing surfaces (the first placing surface 32 and the second placing surface 36) are in contact with the stampable sheet 80 in the disposal step, this does not limit the present disclosure. A contact surface in the upper surface 30 of the lower die 3 which the stampable sheet 80 contacts in an early stage of the press step is also included in the "placing surface" in the present disclosure.

Incidentally, examples of the contact surface that the stampable sheet 80 contacts in an early stage of the press step include a modification shown in FIG. 4.

In this modification, a lower die 3 includes, as shown in FIG. 4, a plurality of pins 60 that protrude upward beyond contact surfaces of the upper surface 30 (a first contact surface 32A and a second contact surface 36A) and a plurality of driving portions 61.

Furthermore, in the lower die 3 in this modification, when an upper die 4 began to move downward after the press step starts, the driving portions 61 move the pins 60 downward (see arrows in FIG. 4). Then, immediately before a lower surface 40 of the upper die 4 contacts the stampable sheet 80, the pins 60 are received within the lower die 3, so that the stampable sheet 80 is placed on contact surfaces (a first placing surface 32 and a second placing surface 36) of the lower die 3.

According to this modification, the contact of the stampable sheet 80 with the lower die 3 is delayed, so that the cooling of the stampable sheet 80 can be delayed.

Furthermore, although in the foregoing embodiment, the movable cores (the first to third movable cores 5 to 7) are provided in the flat surfaces (the first facing surface 42, the bottom surface 34, and the second facing surface 46), movable cores may be provided in slant surfaces such as the first slant surface 31. However, taking the mold release into consideration, it is preferable to provide movable cores so that the movable cores move along a mold release direction.

With regard to the positions at which movable cores are provided, it is preferable that movable cores be provided in a surface between placing surfaces (the first placing surface 32 and the second placing surface 36) such as the bottom surface 34 in the embodiment.

A reason for this is as follows. Since the thermoplastic resin is likely to flow from a placing surface toward a bottom surface, the bottom surface 34 formed between the first placing surface 32 and the second placing surface 36 receives a larger amount of the thermoplastic resin due to flows from the first placing surface 32 and the second placing surface 36 (see the arrows A2 and A3 in FIG. 2C), as described above in conjunction with the embodiment. Therefore, if a movable core is provided in the bottom surface 34 in the embodiment, the hard stop can be effectively prevented. It is more preferable to provide a movable core in a bottom surface whose entire perimeter is surrounded by placing surfaces.

Furthermore, although in the foregoing embodiment, the technical idea of the present disclosure is applied to the excess portion 83 produced due to movement of the thermoplastic resin that forms the stampable sheet 80, the technical idea of the present disclosure is also applicable to the creased portion (excess portion) 281 produced because the reinforcing fiber 282 moves as if it is drawn in together with the thermoplastic resin (see FIG. 9).

Second Embodiment

A second embodiment of the present disclosure will be described.

Figure 5:
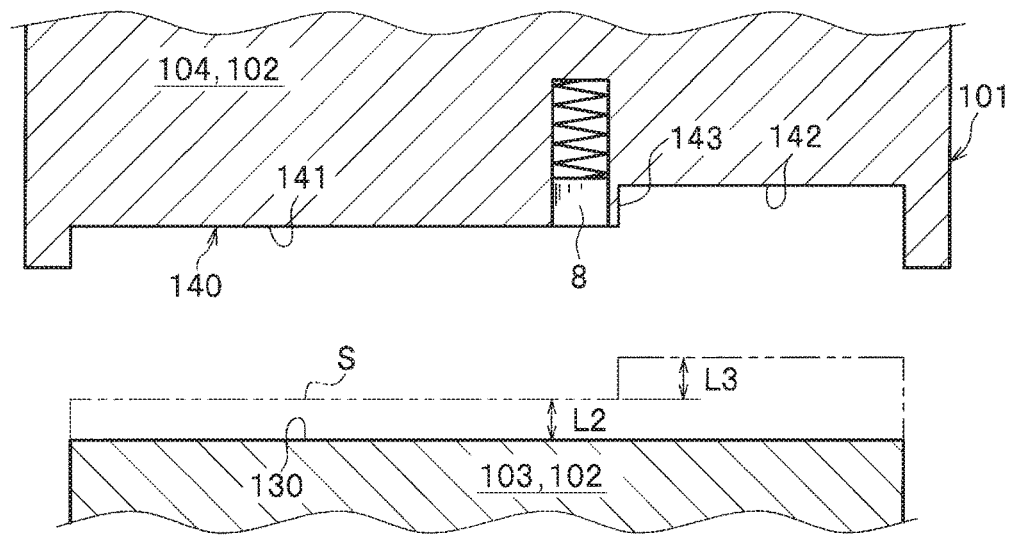
FIG. 5 is a sectional view of a press molding apparatus according to a second embodiment of the present disclosure.

As shown in FIG. 5, in press molding according to the second embodiment, a press molding apparatus 101 of the second embodiment includes a pair of dies 102 and 102 and a press machine (not shown in the drawings).

Figure 7A:
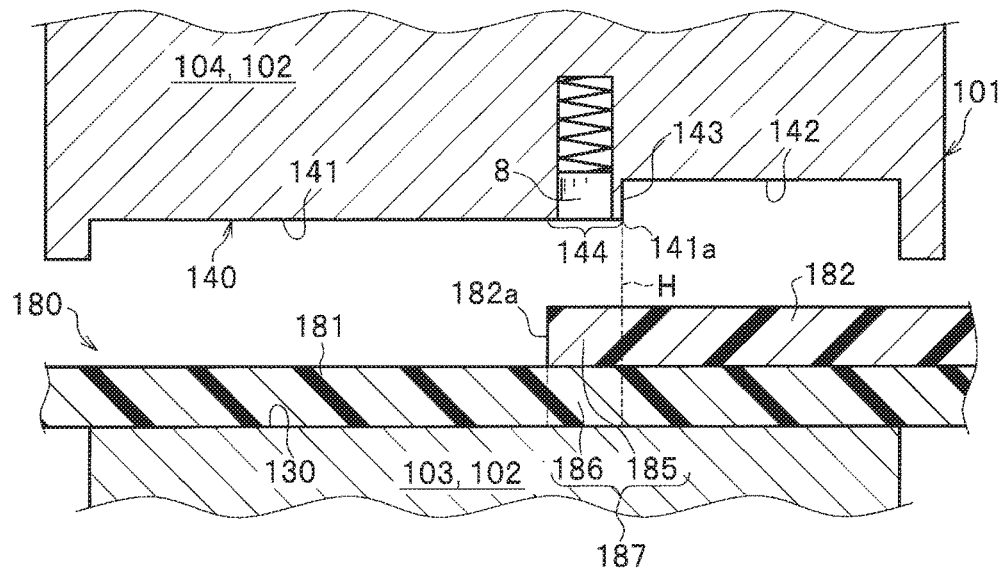
FIGS. 7A to 7C are sectional views showing processes of a press molding method according to the second embodiment, FIG. 7A showing a state in which a stampable sheet is disposed, FIG. 7B showing a state in which an upper die is in contact with the stampable sheet, and FIG. 7C showing a state in which mold clamping has been carried out.
Figure 7B:
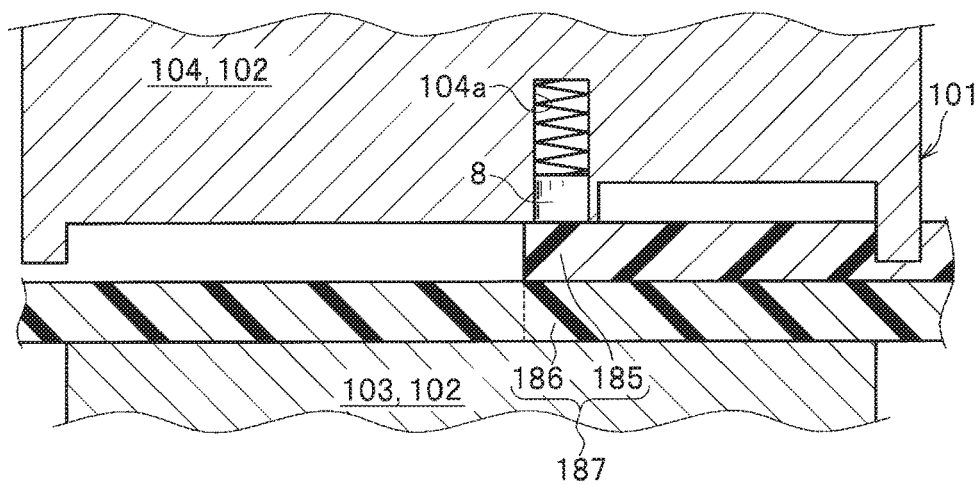
Figure 7C:
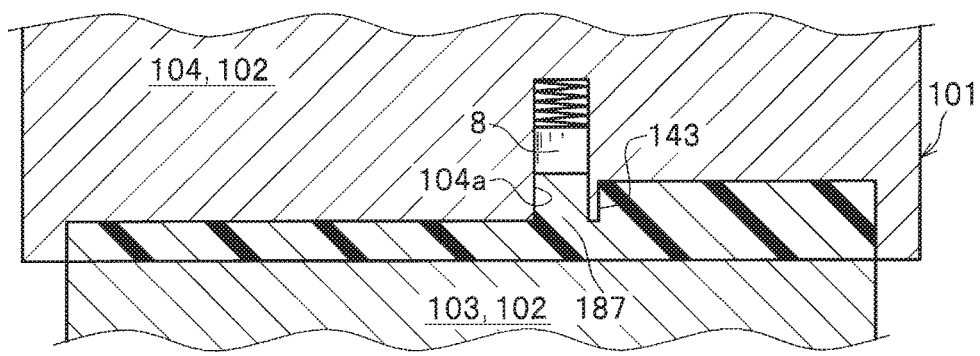

A stampable sheet 180 that is processed by the press molding apparatus 101 includes a first stampable sheet 181 and a second stampable sheet 182 superposed on the first stampable sheet 181 (see FIGS. 7A to 7C).

The following description of the press molding apparatus 101 of the second embodiment will be limited to the two dies 102 and 102, which make a major difference from the press molding apparatus 1 of the first embodiment.

The two dies 102 and 102 include a lower die 103 fixed to a fixed base (not shown) and an upper die 104 that is supported by the press machine and that faces the lower die 103.

An upper surface 130 of the lower die 103 is a flat surface.

A lower surface 140 of the upper die 104 includes a first plane surface 141, a second plane surface 142 positioned above the first plane surface 141, and an up-down-direction surface 143 that extends in an up-down direction and that continuously connects the first plane surface 141 and the second plane surface 142.

In a cavity S formed between the upper surface 130 and the lower surface 140 (see an interrupted line in FIG. 5), the length of compression carried out in the up-down direction by the upper surface 130 and the first plane surface 141 has been set to L2.

Furthermore, as for the cavity S, the length obtained by subtracting L2 from the length of compression carried out in the up-down direction by the upper surface 130 and the second plane surface 142 has been set to L3.

Figure 6:
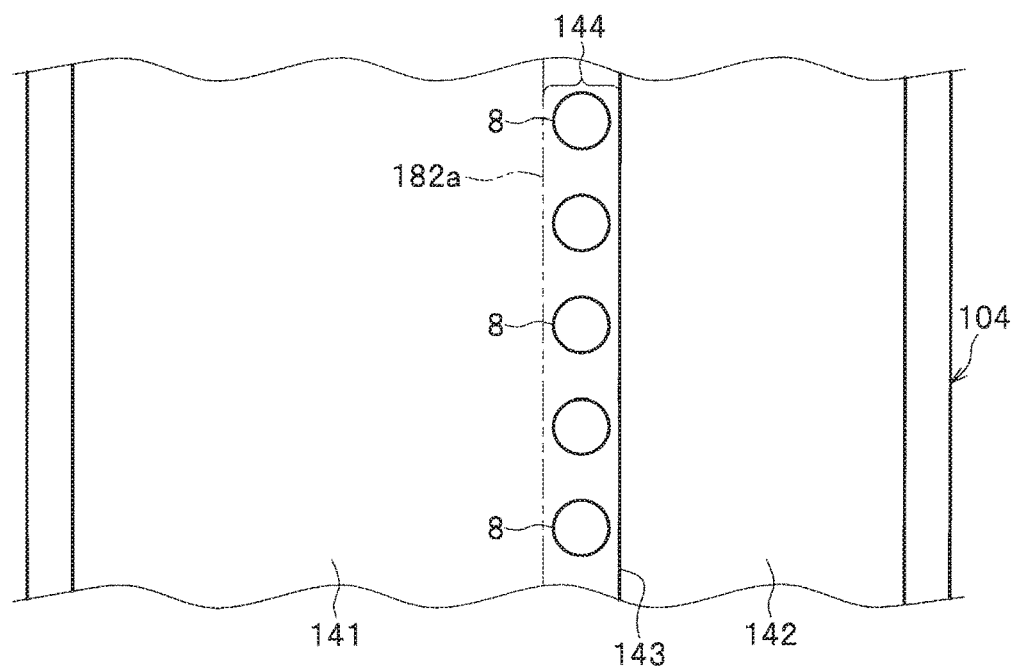
FIG. 6 is a bottom view of an upper die of the press molding apparatus according to the second embodiment.

As shown in FIGS. 5 and 6, the upper die 104 is provided with a plurality of fourth movable cores 8. These fourth movable cores 8 are the same in configuration as the movable cores provided in the first embodiment. The positions at which the plurality of fourth movable cores 8 are provided will be described later.

Press Molding Method

Next, with reference to FIGS. 7A to 7C, a press molding method that uses the press molding apparatus 101 will be described. The press molding method that uses the press molding apparatus 101 includes a disposal step and a press step.

In the disposal step, as shown in FIG. 7A, the heated first stampable sheet 181 is placed on the upper surface 130 of the lower die 103. Next, the heated second stampable sheet 182 is superposed on the first stampable sheet 181.

Note that the thickness of the not-yet-heated first stampable sheet 181 is equal to L2 (see FIG. 5). Furthermore, the thickness of the not-yet-heated second stampable sheet 182 is equal to L3 (see FIG. 5).

Furthermore, a left end portion 185 of the second stampable sheet 182 is disposed in the cavity S. Then, the left end portion 185 is positioned so that a left end 182a of the second stampable sheet 182 is beyond a right end 141a of the first plane surface 141 to the left side (see a straight line H in FIG. 7A).

Due to this positioning, at the time of pressing, the thermoplastic resin (the second stampable sheet 182) can be certainly charged to the up-down-direction surface 143. That is, when the mold clamping is carried out, no void space is formed between the molded product and the up-down-direction surface 143.

A portion of the first stampable sheet 181 where the first stampable sheet 181 overlaps with the left end portion 185 will be hereinafter referred to as lap portion 186.

Furthermore, the left end portion 185 and the lap portion 186 will be collectively referred to as excess portion 187.

A site in the first plane surface 141 which pressurizes the left end portion 185 will be referred to as end portion-pressurizing surface 144.

The fourth movable cores 8 are provided in the end portion-pressurizing surface 144 that pressurizes the left end portion 185 (see particularly FIG. 6).

In the press step, the press machine is driven to move the upper die 104 downward so as to carry out the mold clamping of the lower die 103 and the upper die 104.

Concretely, in the process of the upper die 104 moving downward, the end portion-pressurizing surface 144 is the first to contact the left end portion 185 (see FIG. 7B).

As the upper die 104 moves further downward, only the excess portion 187 is pressed. As a result, part of the excess portion 187 flows out into the surroundings and, simultaneously, the excess portion 187 is degassed to gradually reduce in thickness.

When the internal die pressure caused on the lower die 103 and the upper die 104 by the excess portion 187 reaches the physical property-recovering pressure as the movement of the upper die 104 progresses, the excess portion 187 has the mechanical characteristics of the not-yet-heated stampable sheet 180.

Furthermore, as the upper die 104 moves further downward after the excess portion 187 has obtained the mechanical characteristics of the not-yet-heated stampable sheet 180, the internal die pressure of the excess portion 187 increases and the fourth movable cores 8 are pressurized upward. Thus, part of the excess portion 187 flows into cylindrical holes 104a formed in the first plane surface 141 so that the internal die pressure of the excess portion 187 is kept at the physical property-recovering pressure. As a result, the downward movement of the upper die 104 continues, so that the pressing (compression) of other portions is certainly carried out.

Such other portions also receive flows from the excess portion 187. However, since the left end portion 185, which constitutes the excess portion 187, is small in volume, the internal die pressure of those other portions does not greatly exceed the physical property-recovering pressure. As a result, the downward movement of the upper die 104 continues and the mold clamping is certainly carried out (see FIG. 7C).

After mold opening, mold release is carried out and projections of the molded product (sites formed by the material flowing into the cylindrical holes 104a) to produce a molded product.

According to the press molding apparatus 101 and the press molding method of the second embodiment, occurrence of the hard stop can be prevented. Furthermore, a molded product whose individual portions have the mechanical characteristics of the not-yet-heated stampable sheet 180 can be produced. Still further, the thermoplastic resin is charged onto the up-down-direction surface 143 without forming void space, so that a molded product having a desired shape can be produced.

Although the press molding apparatus 101 and the press molding method of the second embodiment have been described above, the present disclosure is not limited to the examples described above in conjunction with the embodiments.

For example, in the disposal step, an arrangement may be made such that the left end 182a of the second stampable sheet 182 is superposed on the up-down-direction surface 143 in the up-down direction.

This is useful in the case where, due to position shift of the second stampable sheet 182, the left end 182a of the second stampable sheet 182 is beyond the right end 141a of the first plane surface 141 to the left and therefore the left end portion 185 appears.

Figure 8:
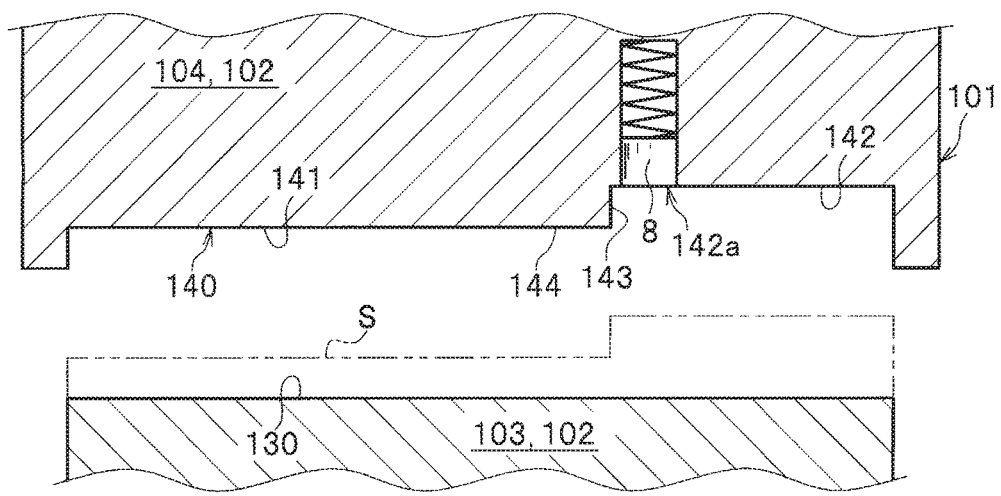
FIG. 8 is a sectional view of a modification of the press molding apparatus of the second embodiment.

The positions at which the fourth movable cores 8 are provided are not limited to the end portion-pressurizing surface 144 that pressurizes the left end portion 185. For example, as shown in FIG. 8, the fourth movable cores 8 may be provided in a left end portion 142a of the second plane surface 142 which is near the end portion-pressurizing surface 144. Furthermore, although not particularly shown in the drawings, fourth movable cores may also be provided in a site in the upper surface 130 of the lower die 103 which contacts the lap portion 186. Thus, the positions at which the fourth movable cores are provided are not particularly limited as long the fourth movable cores are provided near the end portion-pressurizing surface 144.

Although in the first and second embodiments, the movable cores (the first to fourth movable cores 5 to 8) are cylindrical, the shape of the movable cores is not particularly limited in the present disclosure. For example, the movable cores may have a rectangular parallelepiped shape (block shape) that extends along the cavity surface.

What is claimed is:

1. A press molding apparatus, comprising:
   two dies configured to press-mold a heated stampable sheet into a predetermined shape; and
   a movable core provided in one die of the two dies,
   wherein the movable core is disposed at an inward side of an edge portion of a cavity,
   when receiving a first pressure less than a predetermined value, a surface of the cavity is a flat surface which comprises a first surface of the movable core and a second surface of the one die, and
   when receiving a second pressure greater than or equal to the predetermined value, the movable core moves in such a direction that the cavity increases in volume, and
   wherein the movable core is supported by a coil spring that is compressible by the second pressure greater than or equal to the predetermined value.

2. The press molding apparatus according to claim 1, wherein the predetermined value is set to a threshold pressure needed for the heated stampable sheet to recover a mechanical characteristic that the heated stampable sheet had before being heated.

3. The press molding apparatus according to claim 1, wherein:
   the two dies include a lower die and an upper die that faces the lower die;
   the surface of the cavity is constituted by a plurality of surfaces that include a third surface and the second surface positioned below the third surface; and
   the movable core is provided in at least one of the second surface and a facing surface of the upper die which faces the second surface.

4. The press molding apparatus according to claim 1, wherein:
   the two dies include a lower die and an upper die that faces the lower die;
   the surface of the cavity is constituted by a plurality of surfaces that include a third surface and the second surface positioned below the third surface;
   the third surface is configured as a placing surface on which the heated stampable sheet is to be placed; and
   the movable core is provided in at least one of the placing surface and a facing surface of the upper die which faces the placing surface.

5. The press molding apparatus according to claim 1, wherein:
   the press molding apparatus is configured such that at least one of end portions of the heated stampable sheet is disposed in the cavity when placed in the press molding apparatus; and
   the movable core is provided in an end portion-pressurizing surface or near the end portion-pressurizing surface, wherein the end portion-pressurizing surface pressurizes an end portion of the heated stampable sheet when the heated stampable sheet is pressed.

6. The press molding apparatus according to claim 3, wherein the movable core is configured to move in the lower die based on the second pressure on the first surface of the movable core.

7. The press molding apparatus according to claim 3, wherein the upper die is provided with at least two movable cores.

8. The press molding apparatus according to claim 1, wherein the cavity is between the two dies.

9. A press molding apparatus, comprising:
   two dies configured to press-mold a heated stampable sheet into a predetermined shape, wherein the dies include a lower die and an upper die that faces the lower die; and
a movable core provided in one die of the two dies,
wherein the movable core is disposed at an inward side of an edge portion of a cavity,
wherein a surface of the cavity is constituted by a plurality of surfaces that include a first surface and a second surface positioned below the first surface,
wherein the movable core is provided in at least one of the second surface and a facing surface of the upper die which faces the second surface, and
wherein the upper die is provided with at least two movable cores,
when receiving a first pressure less than a predetermined value, the surface of the cavity is a flat surface which comprises a third surface of the movable core and the second surface of the one die, and
when receiving a second pressure greater than or equal to the predetermined value, the movable core moves in such a direction that the cavity increases in volume.

* * * * *